No. 808,434. PATENTED DEC. 26, 1905.
J. CHESBRO.
LAWN MOWER SHARPENER.
APPLICATION FILED FEB. 4, 1905.

2 SHEETS—SHEET 1.

WITNESSES
George M. Anderson.
R. A. Boswell.

INVENTOR
John Chesbro
by E. W. Anderson
Attorney

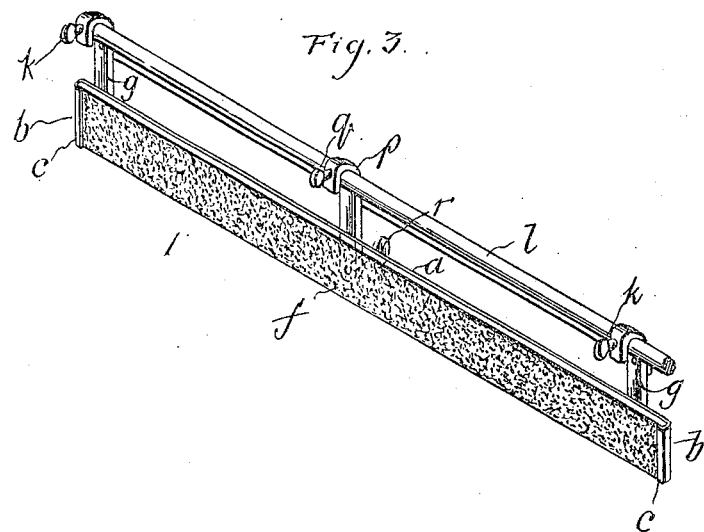
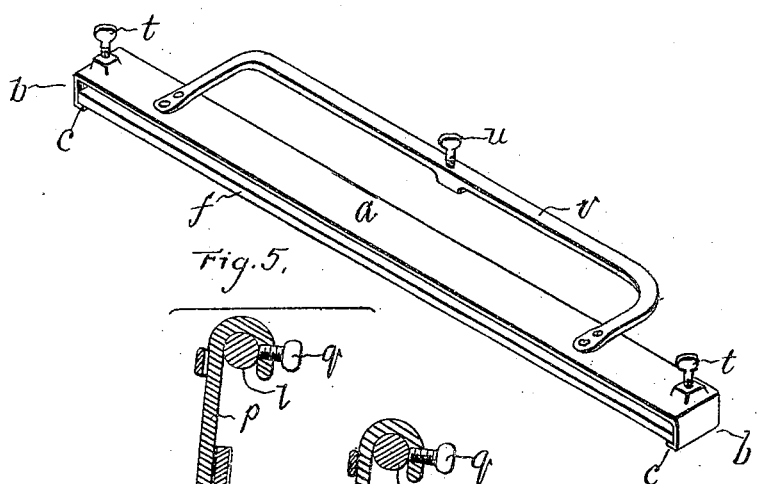
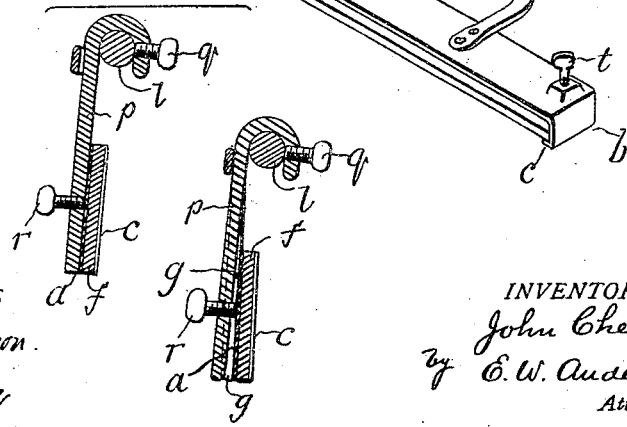

UNITED STATES PATENT OFFICE.

JOHN CHESBRO, OF ONEONTA, NEW YORK.

LAWN-MOWER SHARPENER.

No. 808,434.     Specification of Letters Patent.     Patented Dec. 26, 1905.

Application filed February 4, 1905. Serial No. 244,236.

*To all whom it may concern:*

Be it known that I, JOHN CHESBRO, a citizen of the United States, and a resident of Oneonta, in the county of Otsego and State of New York, have made a certain new and useful Invention in Lawn-Mower Sharpeners; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1:
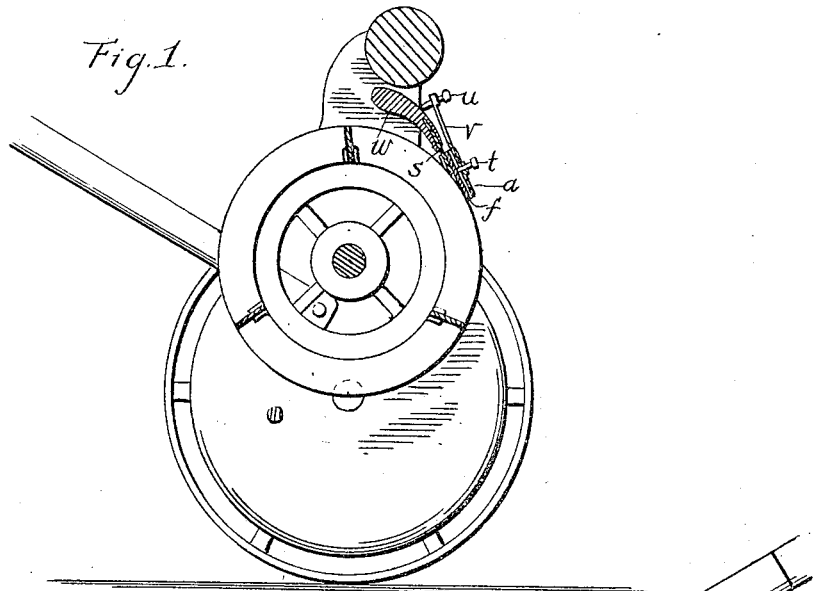
Figure 2:
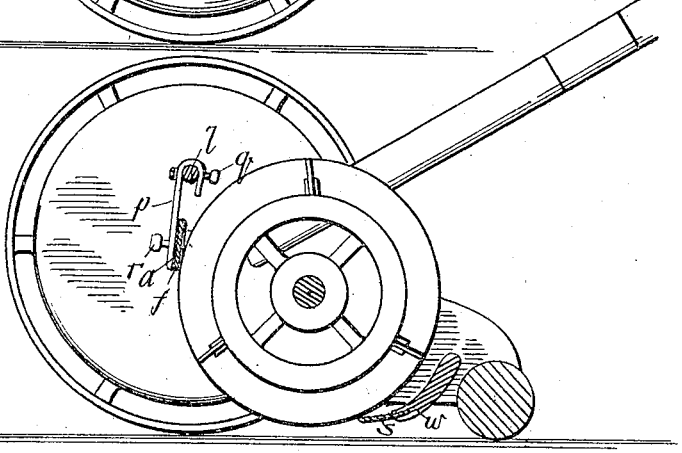
Figures 6, 7:
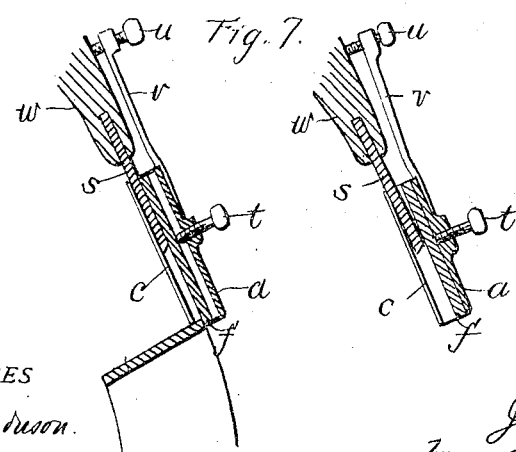

Figure 1 is a cross-section of a lawn-mower having my invention applied to the rigid knife thereof. Fig. 2 is a similar view showing the invention supported by the brace-rod of the mower. Fig. 3 is a detail perspective view of one form of my invention. Fig. 4 is a similar view of the other form of my invention. Fig. 5 shows in detail the means for adjusting the sharpening-bar of the form of the invention applied to the brace-rod of the mower. Figs. 6 and 7 show in detail the means for adjusting the sharpening-bar of the form of the invention applied to the rigid knife of the mower.

The invention is designed to provide an attachment for facilitating sharpening the blades of the rotary knife of a lawn-mower during their rotation in an automatic manner; and it consists in the novel construction and combinations of parts, as hereinafter set forth.

In the accompanying drawings, illustrating the invention, the letter $a$ designates a metallic frame-plate of about the length of the rigid knife of the mower and comparatively narrow in width, such plate having its ends $b$ bent in loop form and terminating in short reversely-bent flanges $c$. In this frame is inclosed and secured the emery stick or whetstone or file $f$, the length of which corresponds to that of the frame $a$. This frame-plate is provided with means of fastening to the mower, which may consist of upward-extending arms $g$ of hook form, having each a clamp-screw $h$ for engagement with the brace-rod $l$ of the mower, in front and above the center of the rotary knives. This device is also provided with a tilting or adjusting arm $p$ of similar form to the arms $g$ and having also a clamp-screw $q$ for engagement with said brace-rod. A second set-screw $r$ is provided in the lower end of the arm $p$ for engagement with the frame-plate $a$ to tilt or adjust the same. In this adjustment the arm $p$ is first clamped to brace-rod $l$, the arms $g$ being loose upon said rod. Adjustment of the set-screw $r$ will thus force the frame-plate $a$ forward to the desired degree. This having been effected, the frame-plate $a$ is fixed by adjustment of the clamp-screws $k$. When the device has been adjusted, the lawn-mower is pushed forward for a short distance and during this movement its knives rotating against the sharpening-bar $f$ are ground to a sharp edge.

When it is desired to use the rigid knife-bar of the mower as the support for the frame-plate or emery-stick holder, the handle of the mower is turned backward and the rotary knives raised into the position shown in Fig. 1 of the drawings. The frame-plate $a$, with its sharpening-bar, is then slipped upon the rigid knife $s$, a sufficient interval being allowed between the end flanges $c$ and the back of said plate to admit such rigid knife and to allow for adjustment of the sharpening-bar, as shown in detail in Figs. 6 and 7 of the drawings.

In adjusting the sharpening-bar to the knife the end clamp-screws $t$ of the frame are loosened sufficiently to allow the frame $a$ to be slipped on the rigid knife $s$. The set-screw $u$, carried by the loop, form attachment $v$ of the frame-plate $a$ and engaging in this case the holder $w$ of the rigid knife is then adjusted to give the frame $a$ and its sharpening-bar the proper inclination for sharpening purposes. The screws $t$ are then tightened to clamp the sharpening-bar in position.

The revolution of the rotary knives of the mower for a short time will thus accomplish the desired result.

Having described the invention, what I claim, and desire to secure by Letters Patent, is—

1. In a lawn-mower-sharpening device, the combination, of a sharpening device including a frame-plate having short reversely-bent end portions, a sharpening-blade inclosed by said plate, and an adjusting-screw for said blade engaging said plate, substantially as specified.

2. In a lawn-mower-sharpening device, the combination of depending arms pivotally connected with the brace-bar of the mower in front and above the center of the rotary knives and carrying the sharpening-blade at their lower ends, and means for adjusting the pressure of said blade to the rotary knives, substantially as specified.

3. In a lawn-mower-sharpening device, the combination of depending suspension-arms pivotally connected at their upper ends with the brace-bar of the mower in front and above the center of the rotary knives, and carrying the sharpening-blade at their lower ends, a fixed arm connected to said brace-bar at its upper end, and an adjusting-screw engaging said fixed arm, substantially as specified.

In testimony whereof I affix my signature in presence of two witnesses.

JOHN CHESBRO.

Witnesses:
GEO. WOHLLEBEN,
B. W. HOYE.